United States Patent [19]
Thiele et al.

[11] Patent Number: 5,973,065
[45] Date of Patent: *Oct. 26, 1999

[54] POLYURETHANE COMPOSITIONS HAVING STABLE REACTIVITY

[75] Inventors: Lothar Thiele, Leichlingen; Nicole Schlingloff, Hilden; Claudia Plutniok, Duesseldorf, all of Germany

[73] Assignee: Henkel Kommanditgesellschaft auf Aktien, Duesseldorf, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/849,164

[22] PCT Filed: Nov. 20, 1995

[86] PCT No.: PCT/EP95/04559

§ 371 Date: May 28, 1997

§ 102(e) Date: May 28, 1997

[87] PCT Pub. No.: WO96/17014

PCT Pub. Date: Jun. 6, 1996

[30] Foreign Application Priority Data

Nov. 29, 1994 [DE] Germany .............. 44 42 353

[51] Int. Cl.⁶ .................................. C08G 18/28
[52] U.S. Cl. .......................... 524/764; 524/777; 524/788; 524/791; 156/331.4
[58] Field of Search .................. 524/764, 788, 524/777, 791; 156/331.4

[56] References Cited

U.S. PATENT DOCUMENTS

| | | | |
|---|---|---|---|
| 3,935,051 | 1/1976 | Bender et al. | 156/331 |
| 4,142,030 | 2/1979 | Dieterich et al. | 521/100 |
| 4,251,427 | 2/1981 | Recker et al. | 528/48 |
| 4,474,900 | 10/1984 | Dominguez | 521/110 |
| 4,742,087 | 5/1988 | Kluth et al. | 521/107 |
| 5,127,973 | 7/1992 | Sengupta et al. | 156/60 |
| 5,473,043 | 12/1995 | Maki et al. | 528/60 |

FOREIGN PATENT DOCUMENTS

| | | |
|---|---|---|
| 0 566 451 | 8/1993 | European Pat. Off. . |
| 36 26 223 | 2/1988 | Germany . |
| 58 213 015 | 12/1983 | Japan . |
| 04 370 146 | 12/1992 | Japan . |

OTHER PUBLICATIONS

Kunststoff–Handbuch, 3rd Edition, vol. 7, Hanser–Vertag (1993), Chapter 8 and Chapter 11, pp. 417–516 and 643–663.

Polyurethanes, Chemistry and Technology, Part. 1, Chemistry, (1962) p. 213.

*Primary Examiner*—Rachel Gorr
*Attorney, Agent, or Firm*—Ernest G. Szoke; Wayne C. Jaeschke; Real J. Grandmaison

[57] ABSTRACT

The pot life of a polyurethane composition is increased by providing a composition containing a polyisocyanate, polyol, highly dispersed silica, and a filler wherein at least a portion of the filler is coated.

57 Claims, No Drawings

POLYURETHANE COMPOSITIONS HAVING STABLE REACTIVITY

This invention relates to retarded uncatalyzed and catalyzed polyurethane compositions having stable reactivity and to their use for adhesives, sealants and casting compounds.

BACKGROUND OF THE INVENTION

One-component and multiple-component polyurethane compositions have long been used as adhesives, sealants or casting compounds. These applications for polyurethane compositions are reviewed, for example, in Chapters 8 and 11 of *Kunststoff-Handbuch*, 3rd Edition, Vol. 7, Hanser-Verlag, 1993. In the case of two-component systems, one component generally consists of liquid polyhydroxy compounds optionally containing fillers, catalysts and other auxiliaries while the second component essentially contains a liquid diisocyanate or polyisocyanate either in pure form or as a so-called quasi-prepolymer or in the form of isomer mixtures. By virtue of their good adhesion properties on various materials and their high tensile, tensile shear and peel strengths, coupled with very high breaking elongation, these adhesives, sealants and casting compounds are used in a number of industrial and manual applications, including for example car manufacture, general utility vehicle manufacture, ship building and boat building, general machine construction, the electrical industry and civil engineering.

In many applications, the steps involved require very long pot lives which, in addition, are expected to remain constant over the period for which the polyurethane compositions are stored before application.

The pot life of a polyurethane composition is understood to be the time left for proper application after complete mixing of a two-component of multiple-component system before the viscosity of the mixture becomes so high through incipient reaction that the mixture can no longer be properly applied.

Pot life can be controlled within certain limits through the type and quantity of catalyst used. However, it has not yet been possible for a given formulation to prolong the reaction and hence the pot life any further without a catalyst. In cases such as these, less reactive isocyanates had to be used. It has often been proposed in the general literature and in the patent literature to retard the uncatalyzed reaction by addition of an acid, cf. for example J. H. Saunders, K. C. Frisch, *Polyurethanes, Chemistry and Technology*, Vol. 1, Chemistry, page 213, Interscience Publ., 1962. For example, the addition of hydrochloric acid or acid chlorides is proposed. However, where this approach is adopted, the reaction is not genuinely retarded, instead all the catalytically active alkaline impurities in the composition are neutralized. However, the addition of acids to adhesives, sealants or casting compounds can lead to corrosion on the surfaces of the substrates to be bonded or encapsulated so that, in many cases, this method cannot be applied.

BRIEF DESCRIPTION OF THE SEVERAL VIEWS OF THE DRAWING

Not applicable.

DETAILED DESCRIPTION OF THE INVENTION

Accordingly, the problem addressed by the present invention was to reduce the reactivity of one-component and, preferably, two-component or multiple-component polyurethane compositions below the so-called "basic reactivity" of the composition, i.e. below the reactivity which the composition has without a catalyst. In addition, the pot life directly related to this reactivity was to remain substantially constant throughout the storage of the unmixed components.

According to the invention, the solution to this problem is characterized in that the one-component or multiple-component polyurethane compositions contain one or more diisocyanates or polyisocyanates,
one or more diols and/or polyols,
highly disperse silicas,
fillers and
optionally other auxiliaries and additives, the fillers being at least partly coated.

In the context of the invention, a "highly disperse silica" is understood to be a fine-particle, substantially amorphous pyrogenic silica with an $SiO_2$ content of more than 99.8% by weight which is obtained, for example, by hydrolysis of silicon tetrachloride in an oxyhydrogen flame. These silicas are commercially available, for example, under the name of "Aerosil®".

The addition of highly disperse silicas to adhesives, sealants or casting compounds has long been known and is regarded as standard practice. Hitherto, silicas have been added with the object of reducing the sedimentation of fillers in the compositions or to provide the compositions with thixotropic rheological behavior. In the case of paste-like products, however, the addition of Aerosil in accordance with the prior art is often unnecessary because the rheological properties of these products are achieved through the fine-particle fillers.

The use of highly disperse silicas for reducing the reactivity of polyurethane systems below their basic reactivity is new and has never been described before. However, the effect of the silicas as a reaction retarder and stabilizer can only be utilized in filler-containing polyurethane systems if the fillers are at least partly coated.

The highly disperse silicas used are preferably the non-aftertreated so-called "hydrophilic" silicas which are commercially available with various specific surfaces (BET surfaces). The following commercial products are mentioned by way of example: Aerosil 380, Aerosil 300, Aerosil 200, Aerosil 150, Aerosil 130.

In addition to hydrophilic silicas, aftertreated so-called "hydrophobic" silicas may also be used for the compositions according to the invention. Any aftertreated hydrophobic silicas known per se may be used, including for example the silicas aftertreated with dimethyl chlorosilane, dimethyl silazane, long-chain chlorosilanes, for example octyl trichlorosilane, or even polydimethyl siloxanes. These silicas are commercially available, for example, under the names of Aerosil R 202, R 805, R 812, R 972, R 974 or CABOSIL N 70-TS.

Suitable fillers are any of the fillers known per se which are widely used in polyurethane chemistry providing they are at least partly coated. Examples of suitable fillers are limestone flour, natural ground chalks (calcium carbonates or calcium magnesium carbonates), heavy spar, talcum, mica, clays or even carbon black. The filler must be at least partly coated, i.e. generally at least 20% by weight and preferably at least 30% by weight of the filler should be coated. The coating of fillers is known per se, the use of coated fillers being recommended in the literature to facilitate their dispersion in the polymer matrix. There is no known reference to the effect of the surface coating on the pot life of polyurethane systems.

The coating material may be selected from a large number of compounds. Surface coatings of long-chain saturated or unsaturated fatty acids, particularly stearic acid, and alkali or alkaline earth metal salts thereof, carboxylated polybutadienes, carboxylated poly-α-olefins, resin acids (abietic acid or derivatives thereof) and/or metal salts and/or esters thereof are mentioned by way of example.

Preferred diols and/or polyols for the binder are liquid polyhydroxy compounds containing two or three hydroxyl groups per molecule, for example difunctional and/or trifunctional polypropylene glycols with molecular weights in the range from 200 to 6,000 and preferably in the range from 400 to 3,000. Statistical and/or block copolymers of ethylene oxide and propylene oxide may also be used. Another group of preferred polyethers are the polytetramethylene glycols which are obtained, for example, by the acidic polymerization of tetrahydrofuran and which have molecular weights in the range from 200 to 6,000 and preferably in the range from 400 to 4,000.

Other suitable polyols are the liquid polyesters which can be obtained by condensation of di- or tricarboxylic acids, for example adipic acid, sebacic acid, glutaric acid, with low molecular weight diols or triols such as, for example, ethylene glycol, propylene glycol, diethylene glycol, triethylene glycol, dipropylene glycol, butane-1,4-diol, hexane-1,6-diol, glycerol or trimethylol propane.

Another group of polyols which may be used in accordance with the invention are polyesters based on ε-caprolactone which are also known as "polycaprolactones".

However, polyester polyols of oleochemical origin may also be used. Oleochemical polyester polyols may be obtained, for example, by complete ring opening of epoxidized triglycerides of a fatty acid mixture containing at least partly olefinically unsaturated fatty acids with one or more alcohols containing 1 to 12 carbon atoms and subsequent partial transesterification of the triglyceride derivatives to alkyl ester polyols containing 1 to 12 carbon atoms in the alkyl group (see, for example, DE-A-3 626 223). Other suitable polyols are polycarbonate polyols and dimer diols (Henkel KGaA) and, in particular, castor oil and derivatives thereof. Hydroxyfunctional polybutadienes, for example of the type commercially available under the name of "Polybd", may also be used as polyols for the compositions according to the invention.

Preferred diisocyanates or polyisocyanates are aromatic isocyanates, for example diphenyl methane diisocyanate either in the form of the pure isomers, as a mixture of the 2,4'-/4,4'-isomers or even in the form of diphenyl methane diisocyanate (MDI) liquefied with carbodiimide which is commercially available, for example, under the name of Isonate 143 L. So-called "crude MDI", i.e. the isomer/oligomer mixture of MDI which is commercially available, for example, under the name of PAPI or Desmodur VK, may also be used. So-called "quasi-prepolymers", i.e. products of the reaction of MDI or toluene diisocyanate (TDI) with low molecular weight diols such as, for example, ethylene glycol, diethylene glycol, propylene glycol, dipropylene glycol or triethylene glycol, may also be used. Although the isocyanates mentioned above are the particularly preferred isocyanates, aliphatic and cycloaliphatic diisocyanates or polyisocyanates, for example hydrogenated MDI ($H_{12}$MDI), tetramethyl xylylene diisocyanate (TMXDI), 1-isocyanatomethyl-3-isocyanato-1,5,5-trimethyl cyclohexane (IPDI), hexane-1,6-diisocyanate (HDI), the biuretization product of HDI, the isocyanuratization product of HDI or dimer fatty acid diisocyanate, may also be used in special cases.

Although a preferred embodiment of the compositions according to the invention is catalyst-free, catalysts may also be used. Suitable catalysts are any of the usual organometallic compounds known in polyurethane chemistry such as, for example, iron compounds and, in particular, tin compounds. Examples of such compounds are 1,3-dicarbonyl compounds of iron, such as iron(III) acetyl acetonate, and in particular the organotin compounds of divalent and tetravalent tin, more especially the Sn(II) carboxylates and the dialkyl Sn(IV) dicarboxylates or the corresponding dialkoxylates, for example dibutyl tin dilaurate, dibutyl tin diacetate, dioctyl tin diacetate, dibutyl tin maleate, tin(II) octoate, tin(II) phenolate or even the acetyl acetonates of divalent and tetravalent tin. Other suitable catalysts are the highly active tertiary amines or amidines which may optionally be used in combination with the tin compounds mentioned above. Suitable amines are both acyclic and, in particular, cyclic compounds, for example tetramethyl butane diamine, bis(dimethylaminoethyl)-ether, 1,4-diazabicyclooctane (DABCO), 1,8-diazabicyclo-(5.4.0)-undecene, 2,2'-dimorphol inodiethyl ether or dimethyl piperazine or even mixtures of the above-mentioned amines.

In addition, the adhesive according to the invention may optionally contain stabilizers. Stabilizers in the context of the present invention are antioxidants, UV stabilizers or hydrolysis stabilizers. The choice of these stabilizers is determined on the one hand by the main components of the composition and, on the other hand, by the application conditions and by the loads which the bond, joint or encapsulation is expected to withstand. If the polyurethane prepolymer is made up predominantly of polyether units, antioxidants—optionally in combination with UV stabilizers—are mainly required. Examples of suitable antioxidants are any of the commercially available sterically hindered phenols and/or thioethers and/or substituted benzotriazoles and/or amines of the HALS type (hindered amine light stabilizer).

If the polyurethane prepolymer is essentially made up of polyester units, hydrolysis stabilizers, for example of the carbodiimide type, are preferably used.

In addition, the compositions according to the invention may contain other auxiliaries and additives known per se, for example plasticizers (such as phthalic acid esters) or additional thixotropicizing agents (for example Bentone, urea derivatives, fibrillated or pulped chopped fibers) or pigment pastes or pigments.

The polyols and the polyisocyanates are preferably used as a two-component system, the so-called resin component containing the polyols and also the fillers, the highly disperse silica and, optionally, drying agents. Suitable drying agents are any of the usual water-binding agents such as, for example, monofunctional isocyanates, orthoformic acid esters and—in a particularly preferred embodiment—sodium aluminium silicates in the form of molecular sieves.

In general, the so-called hardener component only contains the diisocyanate or polyisocyanate or the "quasi-prepolymer", although this component, too, may optionally contain small quantities of fillers, thixotropicizing agents or pigments.

As mentioned at the beginning, the polyurethane compositions according to the invention may be used as adhesives, sealants and/or casting compounds in a number of applications. They are particularly suitable for assembly bonding and structural bonding, for example in the manufacture of sandwich elements.

Particularly preferred embodiments of the invention are described in more detail in the following. The quantities mentioned in the are parts by weight unless otherwise indicated.

EXAMPLE 1 (Comparison Example)
Non-retarded catalyst-free polyurethane system

|  | % by weight |
|---|---|
| Resin component | |
| Castor oil, OH value around 160 | 29.0 |
| Polypropylene glycol, OH value around 240, trifunctional | 5.0 |
| Na—Al silicate in castor oil (1:1 mixture) | 6.0 |
| Limestone flour, uncoated | 20.5 |
| Limestone flour, coated | 39.5 |
| Hardener component | |
| Diphenyl methane-4,4'-diisocyanate (crude MDI) | 100 |
| Mixing ratio of resin to hardener | 6:1 |
| Pot life | 45 mins |
| Pot life after 8 weeks' separate storage of the resin and hardener components | 37.5 mins |

EXAMPLE 2 (Invention)
Retarded catalyst-free polyurethane system

|  | |
|---|---|
| Resin component | |
| Castor oil, OH value around 160 | 29.0 |
| Polypropylene glycol, OH value around 240, trifunctional | 5.0 |
| Na—Al silicate in castor oil (1:1 mixture) | 6.0 |
| Limestone flour, uncoated | 20.5 |
| Limestone flour, coated | 39.0 |
| Aerosil 150 | 0.5 |
| Hardener component and mixing ratio as in Example 1 | |
| Pot life | 60 mins |
| Pot life after storage for 8 weeks | 60 mins |

Comparison of Example 1 (Comparison Example) with Example 2 shows that the addition of Aerosil in accordance with the invention in Example 2 does not lead to any change in pot life, even after 8 weeks' storage of the resin and hardener components. In addition, the pot life as a whole is prolonged as required.

However, if only uncoated limestone flour is used as the filler, pot life cannot be influenced by the addition of Aerosil.

EXAMPLE 3 (Invention)
Accelerated catalyst-containing polyurethane system

|  | |
|---|---|
| Resin component | |
| Castor oil | 27.0 |
| Polypropylene glycol, OH value around 240, trifunctional | 3.0 |
| Na—Al silicate in castor oil (1:1 mixture) | 6.2 |
| Limestone flour, uncoated | 49.475 |
| Limestone flour, coated | 13.5 |
| Aerosil 200 | 0.8 |
| 1,4-Diazabicyclo[2.2.2]octane (33.3% solution in dipropylene glycol) | 0.025 |
| Hardener component and mixing ratio as in Example 1 | |
| Pot life | 35 mins |
| Pot life after 12 weeks' storage | 35 mins |

This Example shows that, even in the case of catalyst-containing formulations, pot life remains constant after prolonged storage where Aerosil and at least partly coated filler are used in accordance with the invention.

What is claimed is:

1. A polyurethane composition of at least two components, said components comprising at least one resin component and at least one hardener component, wherein the resin component comprises:
    castor oil,
    polypropylene glycol,
    Na—Al silicate,
    uncoated limestone flour,
    coated limestone flour,
    highly dispersed silica; and
    wherein the hardener component comprises:
    crude diphenyl methane-4,4'-diisocyanate.

2. A polyurethane composition as in claim 1, wherein said resin component comprises:
    about 29% by weight castor oil having an OH value of about 160,
    about 5% by weight polypropylene glycol having an OH value of about 240,
    about 6% by weight Na—Al silicate in castor oil in a 1:1 mixture,
    about 20% by weight uncoated limestone flour,
    about 39% by weight coated limestone flour,
    about 0.1% to about 5% by weight highly dispersed silica; based on the weight of said polyurethane composition, and
    wherein the hardener component comprises:
    about 100% by weight diphenyl methane-4,4'-diisocyanate.

3. A polyurethane composition of at least two components, said components comprising at least one resin component and at least one hardener component, wherein the resin component comprises:
    castor oil,
    polypropylene glycol,
    Na—Al silicate,
    uncoated limestone flour,
    coated limestone flour,
    highly dispersed silica,
    1,4-Diazabicyclo[2.2.2]octane in a 33% solution in dipropylene glycol; and
    wherein the hardener component comprises:
    crude diphenyl methane-4,4'-diisocyanate.

4. A polyurethane composition as in claim 3, wherein said resin component comprises:
    about 27% by weight castor oil having an OH value of about 160,
    about 3% by weight polypropylene glycol having an OH value of about 240,
    about 6% by weight Na—Al silicate in castor oil in a 1:1 mixture,
    about 50% by weight uncoated limestone flour,
    about 14% by weight coated limestone flour,
    about 0.1% to about 5% by weight highly dispersed silica,
    about 0.03% by weight 1,4-Diazabicyclo[2.2.2]octane in a 33% solution in dipropylene glycol; based on the weight of said polyurethane composition, and
    wherein the hardener component comprises:
    about 100% by weight diphenyl methane-4,4'-diisocyanate.

5. A multi-component system suitable for mixing to form a polyurethane composition, said multi-component system comprising
    (a) a resin component characterized by an absence of isocyanate and comprising:
        (i) at least one polyol comprising liquid polyhydroxy compounds containing at least two hydroxyl groups per molecule;

(ii) at least one filler selected from the group consisting of limestone flour, natural ground chalks, heavy spar, talcum, mica, clays, carbon black and mixtures thereof, wherein at least 20% by weight of the filler is coated with a coating;

(iii) at least one hydrophilic highly dispersed amorphous pyrogenic silica in an amount effective to cause the polyurethane composition to exhibit a longer and more constant pot life upon mixing after the resin component has been stored for a period of time, and (b) a hardener component comprised of at least one isocyanate selected from the group consisting of diisocyanates, polyisocyanates, and mixtures thereof.

6. The multi-component system of claim 5, wherein the polyol is selected from the group consisting of copolymers of ethylene oxide, copolymers of propylene oxide, polytetramethylene glycols, polyesters, polycaprolactones, polycarbonate polyols, dimer dials, hydroxyfunctional polybutadienes, hydroxyfunctional oils with an OH functionality of at least two, difunctional polypropylene oxides, trifunctional polypropylene oxides, polyethylene oxides and mixtures thereof.

7. The multi-component system of claim 5, wherein at least one polyol is a hydroxyfunctional oil selected from the group consisting of castor oil, castor oil derivatives, and mixtures thereof.

8. The multi-component system of claim 5, wherein the resin component is comprised of at least at least one hydroxyfunctional oil and at least one member selected from the group consisting of difunctional polypropylene oxides, trifunctional polypropylene oxides, polyethylene oxides, copolymers of ethylene oxide, and copolymers of propylene oxide.

9. The multi-component system of claim 5, wherein said amount of the hydrophilic highly dispersed amorphous pyrogenic silica is about 0.1 to about 5% by weight, based on the polyurethane composition as a whole.

10. The multi-component system of claim 5, wherein at least about 30% of the filler is coated.

11. The multi-component system of claim 5, wherein the coating is comprised of a substance selected from the group consisting of long chain saturated fatty acids, long chain unsaturated fatty acids, alkali metal salts of long-chain saturated fatty acids, alkaline earth metal salts of long-chain saturated fatty acids, alkali metal salts of long-chain unsaturated fatty acids, alkaline earth metal salts of long-chain unsaturated fatty acids, carboxylated polybutadienes, metal salts of carboxylated polybutadienes, esters of carboxylated polybutadienes, carboxylated poly-α-olefins, metal salts of carboxylated poly-α-olefins, esters of carboxylated poly-α-olefins, rosin acids, metal salts of rosin acids, esters of rosin acids and mixtures thereof.

12. The multi-component system of claim 5, wherein at least one isocyanate is selected from the group consisting of aromatic isocyanates, aliphatic isocyanates, cycloaliphatic isocyanates, dimer fatty acid diisocyanates and mixtures thereof.

13. The multi-component system of claim 5, wherein at least one isocyanate is an aromatic isocyanate selected from the group consisting of diphenyl methane diisocyanate, toluene diisocyanate, diphenyl methane diisocyanate liquified with carbodiimide, products of the reaction of toluene diisocyanate with low molecular weight diols, products of the reaction of diphenyl methane diisocyanate with low molecular weight diols and mixtures thereof.

14. The multi-component system of claim 5, wherein at least one isocyanate is an aliphatic isocyanate selected from the group consisting of hydrogenated diphenyl methane diisocyanate, hexane-1,6-diisocyanate, the biuretization product of hexane-1,6-diisocyanate, the isocyanuratization product of hexane-1,6-diisocyanate and mixtures thereof.

15. The multi-component system of claim 5, wherein at least one isocyanate is a cycloaliphatic isocyanate selected from the group consisting of tetramethyl xylylene diisocyanate, 1-isocyanatomethyl-3-isocyanato-1,5,5-trimethyl cyclohexane and mixtures thereof.

16. The multi-component system of claim 5, wherein the resin component further comprises a drying agent.

17. The multi-component system of claim 5, wherein said multi-component system is catalyst-free.

18. The multi-component system of claim 5, further comprising a catalyst.

19. The multi-component system of claim 18, wherein the catalyst is comprised of at least one member selected from the group consisting of organotin compounds, tertiary amines, amidines, iron compounds and mixtures thereof.

20. The multi-component system of claim 5, further comprising at least one stabilizer.

21. A method of prolonging and making more constant the pot life of a polyurethane composition obtained by mixing a multi-component system comprised of (a) a resin component characterized by an absence of isocyanate and comprising:
  (i) at least one polyol comprising liquid polyhydroxy compounds containing at least two hydroxyl groups per molecule; and
  (ii) at least one filler selected from the group consisting of limestone flour, natural ground chalks, heavy spar, talcum, mica, clays, carbon black and mixtures thereof, wherein at least 20% by weight of the filler is coated with a coating; and (b) a hardener component comprised of at least one isocyanate selected from the group consisting of diisocyanates, polyisocyanates, and mixtures thereof, said method comprising incorporating in the resin component an effective amount of at least one hydrophilic highly dispersed amorphous pyrogenic silica.

22. The method of claim 21, wherein the polyol is selected from the group consisting of copolymers of ethylene oxide, copolymers of propylene oxide, polytetrametlylene glycols, polyesters, polycaprolactones, polycarbonate polyols, dimer diols, hydroxyfunctional polybutadienes, hydroxyfunctional oils with an OH functionality of at least two, difunctional polypropylene oxides, trifunctional polypropylene oxides, polyethylene oxides and mixtures thereof.

23. The method of claim 21, wherein the resin component comprises at least one hydroxyfunctional oil selected from the group consisting of castor oil, castor oil derivatives, and mixtures thereof.

24. The method of claim 21, wherein the hydrophilic highly dispersed amorphous pyrogenic silica is incorporated in an amount of about 0.1 to about 5% by weight, based on the polyurethane composition as a whole.

25. The method of claim 21, wherein the coating is comprised of a substance selected from the group consisting of long-chain saturated fatty acids, long chain unsaturated fatty acids alkali metal salts of long-chain saturated fatty acids, alkaline earth metal salts of long-chain saturated fatty acids, alkali metal salts of long-chain unsaturated fatty acids, alkaline earth metal salts of long-chain unsaturated fatty acids, carboxylated polybutadienes, metal salts of carboxylate polybutadienes, esters of carboxylated polybutadienes, carboxylated poly-α-olefins, metal salts of carboxylated poly-α-olefins, esters of carboxylated poly-α-olefins, rosin acids, metal salts of rosin acids, esters of rosin acids and mixtures thereof.

26. The method of claim 21, wherein the isocyanate is selected from the group consisting of aromatic isocyanates, aliphatic isocyanates, cycloaliphatic isocyanates, dimer fatty acid diisocyanates and mixtures thereof.

27. The method of claim 21, wherein the resin component further comprises a drying agent.

28. The method of claim 21, wherein the multi-component system is catalyst-free.

29. The method of claim 21, wherein the multi-component system further comprises a catalyst.

30. The method of claim 29, wnerein the catalyst comprises at least one member selected from the group consisting of organotin compounds, tertiary amines, amidines, iron compounds and mixtures thereof.

31. The method of claim 21, further comprising at least one stabilizer.

32. A multi-component system suitable for mixing to form a polyurethane composition, said multi-component system comprising
   (a) a resin component characterized by an absence of isocyanate and comprising:
      (i) polyols comprising liquid polyhydroxy compounds containing at least two hydroxyl groups per molecule, wherein at least one polyol is selected from the group consisting of copolymers of propylene oxide, polypropylene oxides, and mixtures thereof and at least one polyol is a hydroxyfunctional oil,
      (ii) at least one filler selected from the group consisting of limestone flour, natural ground chalks, heavy spar, talcum, mica, clays, carbon black and mixtures thereof, wherein at least 30% by weight of the filler is coated with a coating;
      (iii) at least one hydrophilic highly dispersed amorphous pyrogenic silica in an amount of about 0.1 to about 5% by weight, based on the polyurethane composition as a whole, and
      (iv) a drying agent; and
   (b) a hardener component comprised of at least one aromatic isocyanate selected from the group consisting of aromatic diisocyanates, aromatic polyisocyanates, and mixtures thereof;
wherein said polyurethane composition exhibits a longer and more constant pot life upon mixing after being stored for a period of time than an analogous polyurethane composition which does not contain the hydrophilic highly dispersed amorphous pyrogenic silica.

33. The multi-component system of claim 32, wherein the hardener component consists essentially of aromatic isocyanate.

34. The multi-component system of claim 32, wherein at least one polyol is a polypropylene glycol containing two or three hydroxyl groups per molecule.

35. The multi-component system of claim 32, wherein the hydroxyfunctional oil is selected from the group consisting of castor oil, castor oil derivatives, and mixtures thereof.

36. The multi-component system of claim 32, wherein said amount of the hydrophilic highly dispersed amorphous pyrogenic silica is about 0.3 to about 3% by weight, based on the polyurethane composition as a whole.

37. The multi-component system of claim 32, wherein the coating is comprised of a long chain fatty acid or alkali metal or alkaline earth metal salt thereof.

38. The multi-component system of claim 32, wherein the aromatic isocyanate comprises crude MDI.

39. The multi-component system of claim 32, wherein the drying agent is selected from the group consisting of monofunctional isocyanates orthoformic acid esters, sodium aluminum silicates in the form of molecular sieves and mixtures thereof.

40. The multi-component system of claim 32, wherein said multi-component system is catalyst-free.

41. The multi-component system of claim 32, further comprising a catalyst component comprising at least one member selected from the group consisting of organotin compounds, tertiary amines, amidines, iron compounds and mixtures thereof.

42. The multi component system of claim 32, further comprising at least one stabilizer selected from the group consisting of antioxidants, UV stabilizers, hydrolysis stabilizers and mixtures thereof.

43. The multi-component system of claim 32, wherein at least one filler is a limestone flour.

44. A method of prolonging and making more constant the pot life of a polyurethane composition obtained by mixing a multi-component system comprised of
   (a) a resin component characterized by an absence of isocyanate and comprising:
      (i) polyols comprising liquid polyhydroxy compounds containing at least two hydroxyl groups per molecule, wherein at least one polyol is selected from the group consisting of copolymers of propylene oxide, polypropylene oxides, and mixtures thereof and at least one polyol is a hydroxyfunctional oil;
      (ii) at least one filler selected from the group consisting of limestone flour, natural ground chalks, heavy spar, talcum, mica, clays, carbon black and mixtures thereof, wherein at least 30% by weight of the filler is coated with a coating; and
      (iii) a drying agent; and
   (b) a hardener component comprised of at least one aromatic isocyanate selected from the group consisting of aromatic diisocyanates, aromatic polyisocyanates, and mixtures thereof;
said method comprising incorporating into the resin component at least one hydrophilic highly dispersed amorphous pyrogenic silica in an amount of about 0.1 to about 5% by weight, based on the polyurethane composition as a whole.

45. The method of claim 44, wherein the hardener component consists essentially of aromatic isocyanate.

46. The method of claim 44, wherein at least one polyol is a polypropylene glycol containing two or three hydroxyl groups per molecule.

47. The method of claim 44, wherein the hydroxyfunctional oil is selected from the group consisting of castor oil, castor oil derivatives, and mixtures thereof.

48. The method of claim 44, wherein said amount of the hydrophilic highly dispersed amorphous pyrogenic silica is about 0.3 to about 3% by weight, based on the polyurethane composition as a whole.

49. The method of claim 44, wherein the coating is comprised of a long chain fatty acid or alkali metal or alkaline earth metal salt thereof.

50. The method of claim 44, wherein the aromatic isocyanate comprises crude MDI.

51. The method of claim 44, wherein the drying agent is selected from the group consisting of monofunctional isocyanates, orthoformic acid esters, sodium aluminum silicates in the form of molecular sieves and mixtures thereof.

52. The method of claim 44, wherein the multi-component system is catalyst-free.

53. The method of claim 44, wherein the multi-component system further comprises a catalyst comprising at least one member selected from the group consisting of organotin compounds, tertiary amines, amidines, iron compounds and mixtures thereof.

54. The method of claim 44, further comprising at least one stabilizer selected from the group consisting of antioxidants, UV stabilizers, hydrolysis stabilizers and mixtures thereof.

55. The method of claim 44, wherein at least one filler is a limestone flour.

56. A process comprising a step for adhering, sealing or casting, wherein the multi-component system of claim 5 is mixed to form a polyurethane composition and said polyurethane composition is used in said step.

57. A process comprising a step for adhering, sealing or casting, wherein the multi-component system of claim 32 is mixed to form a polyurethane composition and said polyurethane composition is used in said step.

* * * * *